UNITED STATES PATENT OFFICE.

FRIEDRICH KRECKE AND IGNAZ ROSENBERG, OF BIEBRICH, GERMANY, ASSIGNORS TO KALLE & CO., OF SAME PLACE.

BLUE TETRAZO DYE.

SPECIFICATION forming part of Letters Patent No. 563,385, dated July 7, 1896.

Application filed December 30, 1895. Serial No. 573,815. (Specimens.) Patented in England January 9, 1894, No. 515.

*To all whom it may concern:*

Be it known that we, FRIEDRICH KRECKE and IGNAZ ROSENBERG, doctors of philosophy, residing at Biebrich-on-the-Rhine, Germany, have invented new and useful Improvements in the Manufacture of Azo Dyestuffs, (for which we have obtained Letters Patent in England, No. 515, dated January 9, 1894,) of which the following is a specification.

This invention relates to the manufacture of a series of new tetrazo colors made by combining tetrazo bodies with two molecules of 1.8.4.6. amidonaphtholdisulfo-acid, called "K" acid.

In order to carry out our invention, we proceed, for instance, as follows: 18.4 kilos of benzidin are dissolved in eight hundred liters of water and twenty-four kilos of hydrochloric acid of 20° Baumé. After this solution has been cooled another twenty-four kilos of hydrochloric acid and fourteen kilos of nitrite of sodium are added to it. The so-obtained solution of tetrazo-diphenyl chlorid is run into a solution of sixty-eight kilos acid sodium salt of 1.8.4.6. amidonaphtholdisulfoacid, and twenty-five kilos of soda ash in one thousand liters of water. The formation of the new dyestuff is soon finished. It is salted out, pressed, and dried. It represents a crystalline powder of yellow-bronze color, soluble in water, almost insoluble in alcohol, and dyeing on unmordanted cotton a bright violet-blue shade of great intensity.

If the first molecule of K acid is combined with the tetrazo-diphenyl in acid solution and only the second molecule in presence of an excess of alkali, a color which is somewhat redder in shade is obtained.

Instead of the benzidin used in the example other aromatic diamins, for instance, tolidin, dianisidin, diamidostilbene, diamidobenzene azo naphthalene, and sulfo or carbo acids thereof can be employed.

The color, for instance, made by combining one molecule of tetrazo dimethoxydiphenyl with two molecules of K acid in alkaline solution dyes a bright blue on unmordanted cotton. The said K acid has been applied for by us in application filed December 30, 1895, Serial No. 573,812. All the colors of this series can be diazotized again in solution or on the textile fiber and combined with amins or phenols.

What we claim is—

1. The process of manufacturing tetrazo dyestuffs herein described which consists in combining one molecule of a tetrazo body with two molecules of 1.8.4.6. amidonaphtholdisulfo-acid.

2. As a new product the azo colors which may be formed by combination of one molecule of tetrazo-diphenyl and two molecules of 1.8.4.6. amidonaphtholdisulfo-acid in alkaline solution, which represents a crystalline powder of yellow-bronze color soluble in water almost insoluble in alcohol and dyeing a bright violet-blue of great depth on unmordanted cotton.

In testimony whereof we have signed our names to this specification in the presence of two subscribing witnesses.

FRIEDRICH KRECKE.
IGNAZ ROSENBERG.

Witnesses:
ROBERT DORFELDER,
CARL ED. HAHN.